United States Patent [19]

DiSimone et al.

[11] Patent Number: 5,044,927
[45] Date of Patent: Sep. 3, 1991

[54] MOLD CLAMPING EQUILIZATION SYSTEM

[75] Inventors: John DiSimone, Woodbridge, Canada; Paul Brown, St. Croix, V.I.; Robert D. Schad, Toronto, Canada

[73] Assignee: Husky Injection Molding Systems, Ltd., Bolton, Canada

[21] Appl. No.: 524,482

[22] Filed: May 17, 1990

[51] Int. Cl.⁵ ............................................. B29C 45/66
[52] U.S. Cl. ................................ 425/567; 264/297.2; 264/328.8; 425/572; 425/589; 425/595
[58] Field of Search ............... 425/567, 570, 572, 574, 425/589, 595; 264/297.2, 328.8

[56] References Cited

U.S. PATENT DOCUMENTS

| | | | |
|---|---|---|---|
| 3,417,433 | 12/1968 | Teraoka | 425/559 |
| 4,586,887 | 5/1986 | Gellert | 425/549 |
| 4,753,592 | 6/1988 | Kaaden | 425/572 |
| 4,867,938 | 9/1989 | Schad et al. | 425/557 |

Primary Examiner—Timothy Heitbrink
Attorney, Agent, or Firm—Bachman & LaPointe

[57] ABSTRACT

Injection molding machines for making plastic articles having a stack mold arrangement frequently suffer from the problem of unbalanced forces. Various novel techniques for counteracting and/or avoiding the production of these forces are disclosed. These techniques include the use of latches to lock an injection nozzle to a sprue bar, the use of shutters to lock the sprue bar to a stationary platen, the use of a force compensator in a moving stack mold half, and the use of an injection nozzle axially offset from the sprue bar.

18 Claims, 5 Drawing Sheets

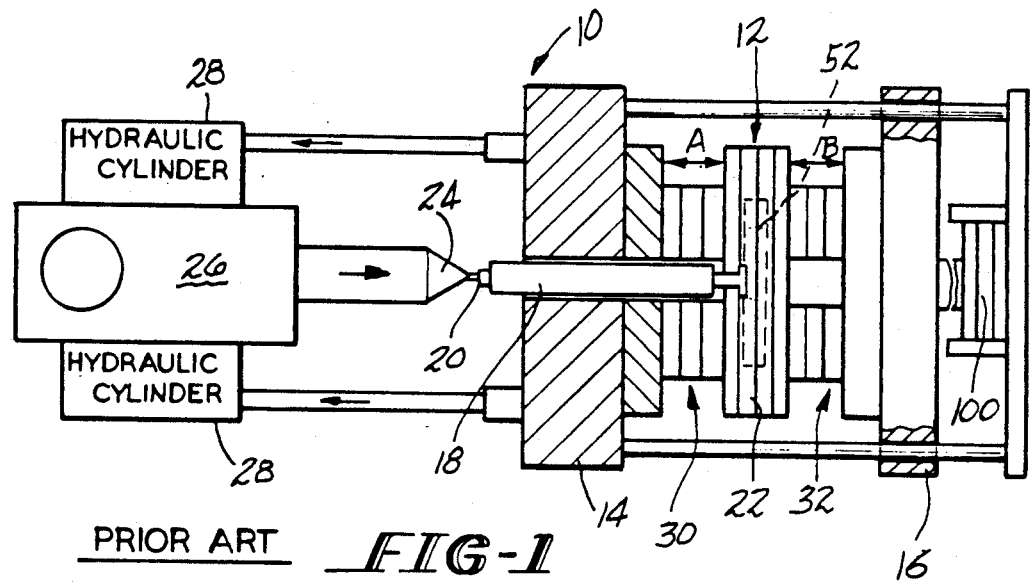
PRIOR ART  FIG-1
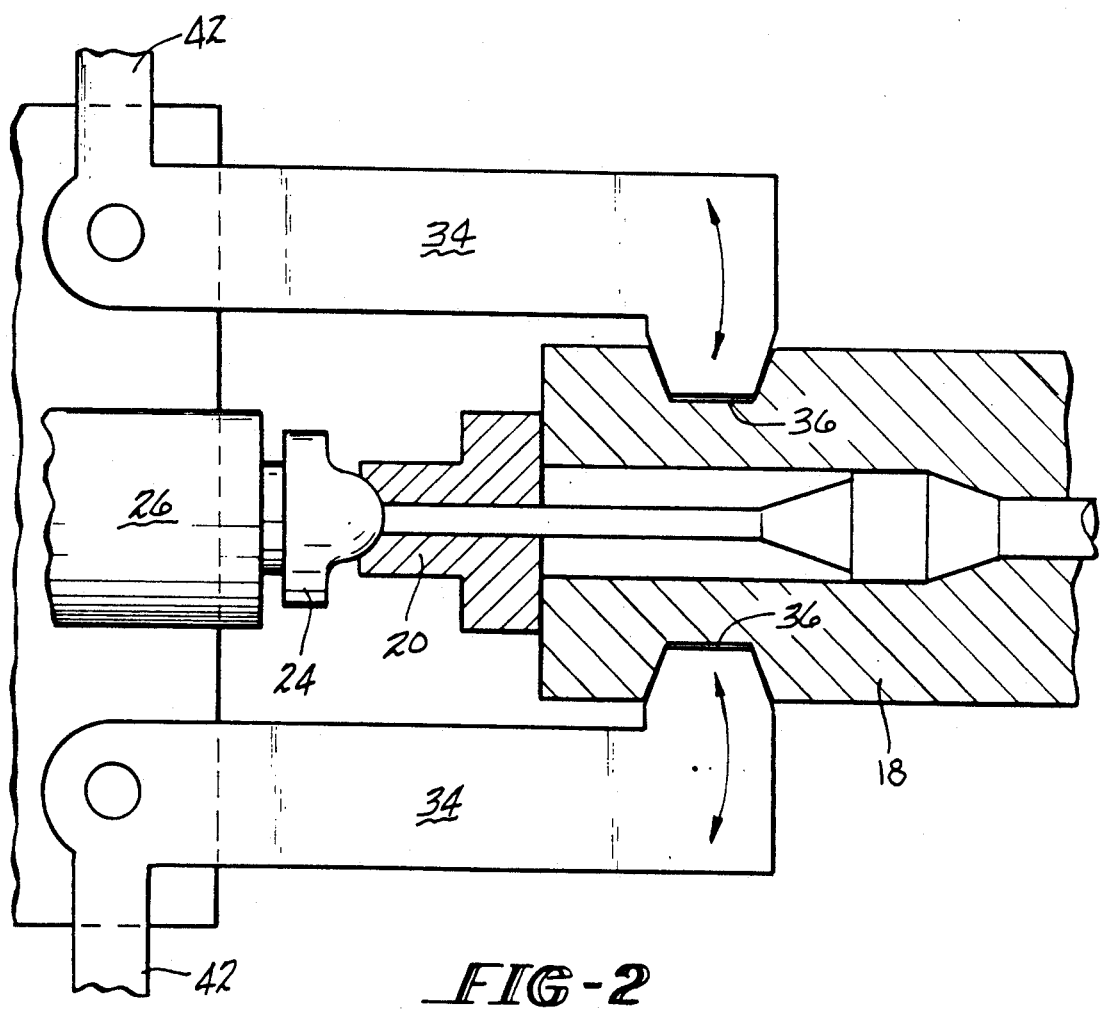
FIG-2

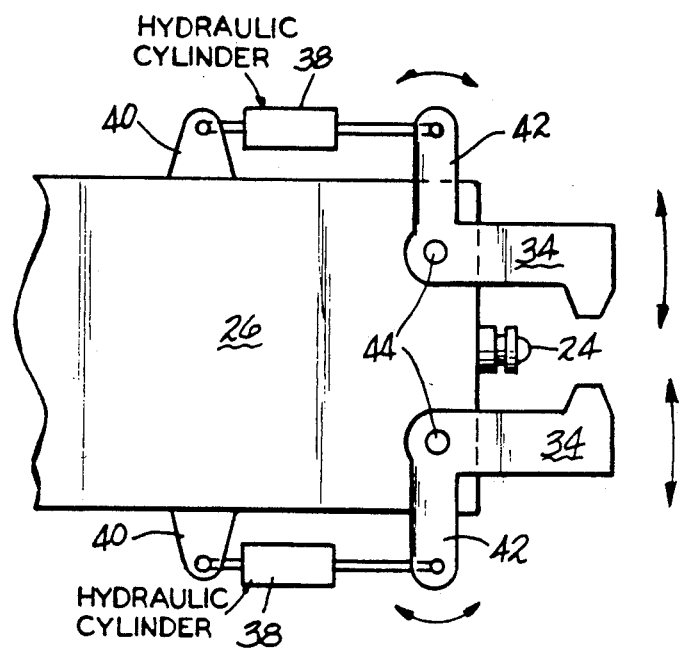
FIG-3
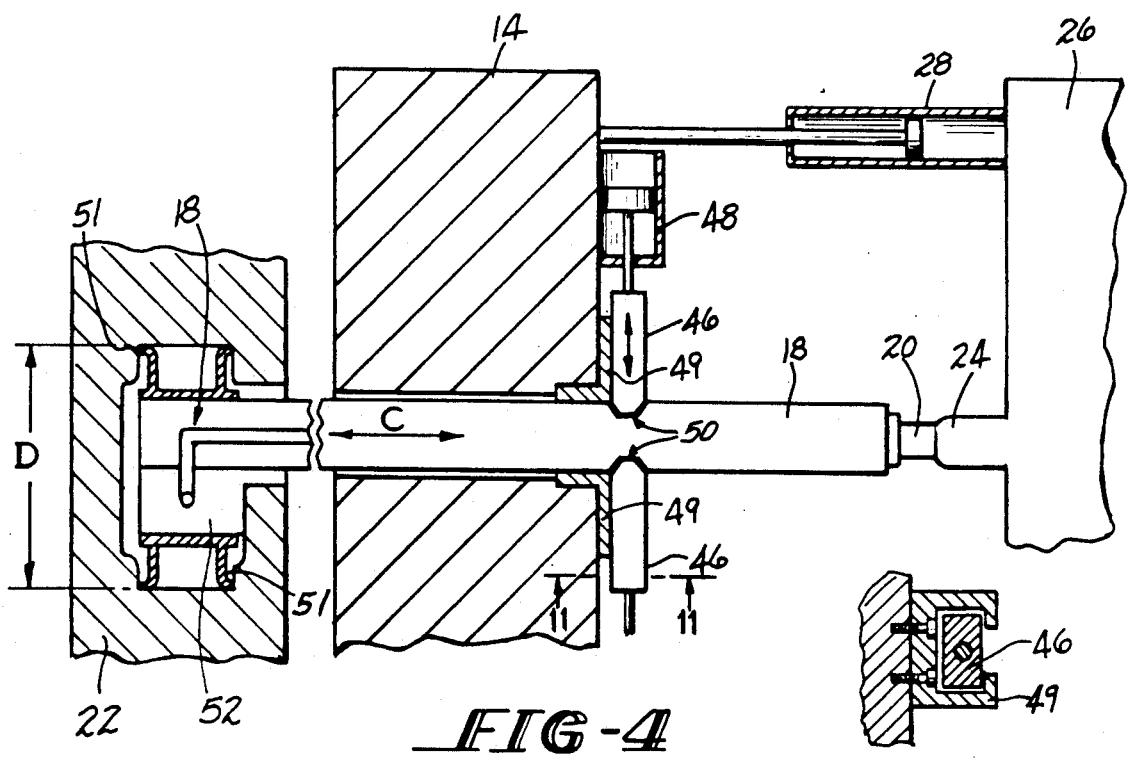
FIG-4
FIG-11

MOLD CLAMPING EQUILIZATION SYSTEM

BACKGROUND OF THE INVENTION

The present invention relates to injection molding machines for making plastic articles and in particular to those using stack molds.

Conventional injection molding machines have devices attached to the stationary platen to hold the machine nozzle against the mold's sprue bush during injection. These holding devices typically take the form of hydraulic cylinders. They have to be strong enough to resist the separating force between the nozzle and the bush generated by the injection pressure of the plastic developed over the orifice size of the nozzle. Typically, this separating force is on the order of 20 tons.

In the case of a single face mold, the reaction of the separating force is transmitted to the stationary platen via the cylinder and from the platen to the mold sprue bush via the stationary half of the mold. Thus, the 20 ton force does not contribute to the force trying to separate the mold during injection. In the case of a stack mold, the force is transmitted to the stationary platen on the core half of one side of the stack mold and not directly to the sprue bush. This component is attached to the sprue bar which is in turn mounted on the center section of the stack mold. Thus the 20 ton force is added to the separating forces affecting the stationary platen half of the stack mold and is subtracted from those forces affecting the moving half of the stack mold.

The problem may best be understood from the following discussion with reference to FIG. 1 of the drawings. FIG. 1 illustrates an injection molding machine 10 having a stack mold 12 mounted between a stationary platen 14 and a moving platen 16. The stack mold 12 has a sprue bar 18 and a sprue bush 20 mounted to the movable center section or platen 22 of the stack mold. A machine nozzle 24 mounted on an injection unit 26 is maintained in contact with the sprue bush 20 during injection by the hydraulic cylinder devices 28 attached between the injection unit 26 and the stationary platen 14. As a result of this construction, the reaction force of the cylinder devices 28 is added to the separating force A and subtracted from the separating force B. For example, if the mold 12 is clamped in a 300 ton machine by a hydraulic cylinder 100 and cylinders 28 develop 20 tons of force then the net clamping force on the stationary half 30 of the stack mold is 300 tons—20 tons which equals 280 tons and the net clamping force on the moving half 32 of the stack mold is 300 tons+20 tons which equals 320 tons.

This unequal clamping of the stack mold halves causes premature flashing of the stationary half of the stack mold in marginal molding situations where all the clamping force available is required.

This problem has been known for years. It has been resolved by typically oversizing the clamping requirements for stack molds or by using different gate sizes in the two halves of the stack mold to compensate for the different clamping forces. Using an oversize clamp is inefficient and modifying gate sizes has to be done empirically and entails customizing mold components. In some marginal cases even this solution does not work as it reduces the processing window available for molding the part.

Accordingly, it is an object of the present invention to provide an injection molding machine wherein unbalanced clamping forces are avoided.

It is a further object of the present invention to provide an injection molding machine as above which avoids the problem of premature flashing.

These and other objects and advantages will become more apparent from the following description and drawings wherein like reference numerals depict like elements.

SUMMARY OF THE INVENTION

In accordance with the present invention, improved injection molding apparatuses having novel ways of counteracting out of balance forces are described. The apparatuses having particular utility in the injection molding of plastic articles.

The improved injection molding apparatuses of the present invention generally comprise a stack mold arrangement including a stationary mold member fixed to a stationary platen, a movable central mold member and a movable outer mold member which form at least two molds. Each apparatus further includes means for injecting plastic material into the molds including an injection nozzle and sprue means for engaging the nozzle when the molds are in a closed position so as to distribute plastic material into the molds, means for creating a clamping force between the mold members, and means for maintaining the sprue means in contact with the injection nozzle and for maintaining balanced forces on both sides of the stack mold arrangement.

A number of different molding apparatuses having a variety of mechanisms for maintaining balanced forces are disclosed. In a first embodiment of the present invention, the maintaining means comprises a latch arrangement for clamping the sprue means to the injection nozzle. In a second embodiment, the maintaining means comprises a shutter arrangement for substantially preventing residual forces from being transmitted along the sprue means.

In yet another embodiment, the means for maintaining balanced forces is formed by a force compensator for developing forces in reaction to any separating force transmitted along the sprue means.

In still another embodiment, the injection nozzle and the sprue means are axially offset from each other and are held in a desired relationship by a plurality of blocks mounted to one of the mold halves of the stack mold.

Further details of the molding apparatuses of the present invention will be brought out in the following description.

BRIEF DESCRIPTION OF THE DRAWINGS

FIG. 1 is a plan view of an injection molding machine having a stack mold arrangement;

FIG. 2 is a plan view of a mechanism for latching a sprue bush and an injection nozzle;

FIG. 3 is a plan view of an actuation mechanism for the latching mechanism of FIG. 2;

FIG. 4 is a plan view of an alternate embodiment showing latching of the sprue bar by shutter mechanisms attached to a stationary platen;

FIG. 11 is a sectional view taken along lines 11—11 in FIG. 4.

DETAILED DESCRIPTION

Figure 5:
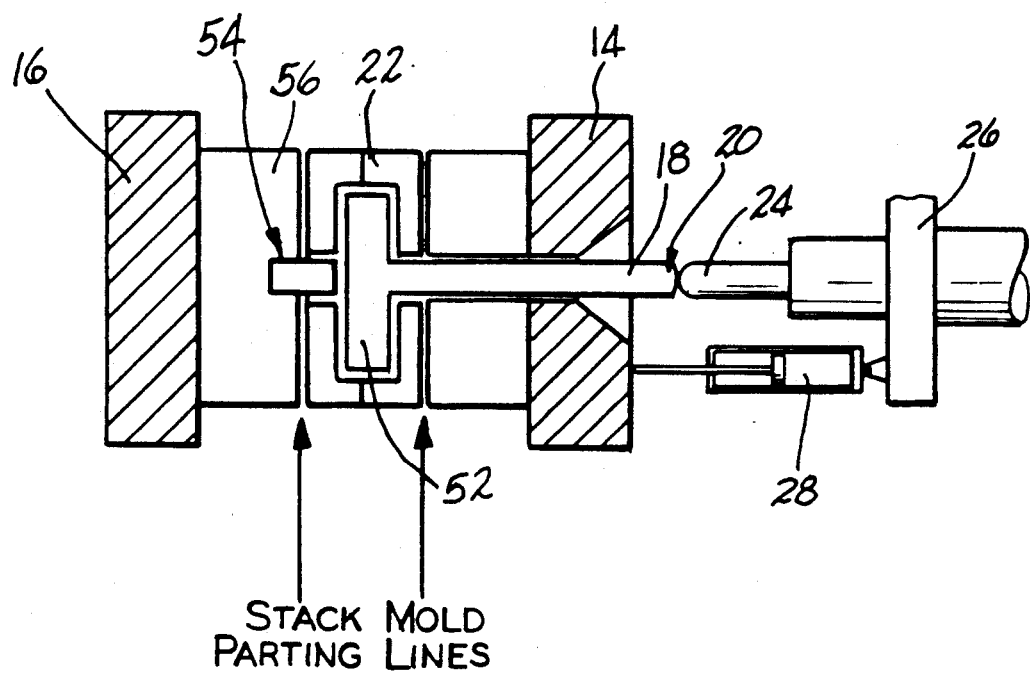
FIG. 5 is a plan view of a third embodiment having a force compensator.

Referring now to the drawings, FIGS. 2 and 3 show one mechanism for substantially avoiding unbalanced separating forces in the mold halves of an injection molding apparatus similar to that shown in FIG. 1. In this embodiment, the sprue bush 20 is maintained in locked contact with the injection nozzle 24 by means of latches 34. The latches 34 engage slots 36 in the sprue bar when the mold halves 32 and 30 are in a mold closed position during the molding cycles.

The latches 34 are moved between a disengaged position and an engaged position by the hydraulic piston-cylinder devices 38 shown in FIG. 3. The piston-cylinder devices 38 are mounted to arms 40 projecting from the barrel head or shooting pot portion of the injection unit 26. Each device 38 has a remote end of a piston arm connected to a link 42 which is in turn connected to a respective latch 34. As shown in FIG. 3, extension-retraction of a piston arm causes a respective latch 34 to move between the engaged and disengaged position by rotation about the axis 44.

The locking action of the latches 34 is only actuated immediately prior to injection of the plastic material into the sprue bush and the molds. The locking action is relaxed at the end of the hold pressure or clamping force period of the molding cycle. It should be noted that any suitable means known in the art such as a hydraulic cylinder ram 100 may be used to apply the desired clamping force.

Hydraulic cylinders 28 are used to move the injection nozzle 24 into and out of engagement with the sprue bush 20. When the latches 34 are engaged in the slots 36, the cylinders 28 are released to allow slight movements of the sprue bar/injection unit to occur while they are latched together. When the latches are disengaged from the sprue bar 18, the stack mold connected to the sprue bar is able to open and close freely and the sprue bush 20 is allowed to completely disengage from the nozzle 24.

By locking the injection nozzle 24 and the sprue bush 20 together at the point where the separating force generated from injection pressure is created, residual force components are not transmitted to the stack mold halves 30 and 32 and consequently unbalanced separating forces in the mold halves are avoided. Thus both halves of the stack mold are held clamped together with equal force and identical conditions for molding exist in both halves.

FIG. 4 illustrates an alternative embodiment in which the sprue bar 18 is latched by means of shutters 46 attached to the stationary platen. Each shutter 46 slides in a gib 49 bolted to the stationary platen 14. Each shutter is activated by a hydraulic piston-cylinder device 48 which is also mounted to the stationary platen 14.

Each shutter 46 moves into and out of a slot 50 cut into the sprue bar 18. This arrangement effectively contains the forces generated at the nozzle/sprue bush connection and prevents residual forces being transmitted along the sprue bar 18 to the center section 22 of the stack mold.

In the embodiment of FIG. 4, side cylinders 28 which extend between the injection unit 26 and the stationary platen 14 are used to resist the separation force which occurs at the nozzle/sprue bush connection. Any reaction to the separation force transmitted along the sprue bar is blocked by the shutters 46. Thus balanced clamping forces are available in each half of the stack mold.

Still further, the apparatus of FIG. 4 makes use of a sliding seal arrangement between the sprue bar 18 and the manifold 52 to change the direction of the injection force. The sprue 18 and the manifold distributor 52 in the center mold section are heated from a cold condition when the molding machine is initially started. As the sprue bar and the manifold distributor expand in the direction D as a result of the increasing temperature, they compress insulators 51. The resulting compression force seals the connection between the sprue bar and the manifold distributors and creates a sliding seal arrangement. Since this occurs after the sprue bar has finished expanding thermally along the direction C, the slot 50 is always aligned with the shutters 46 as thermal expansion and mold compression deflections are accommodated by the sliding seal at the sprue bar/manifold connection.

Figure 6:
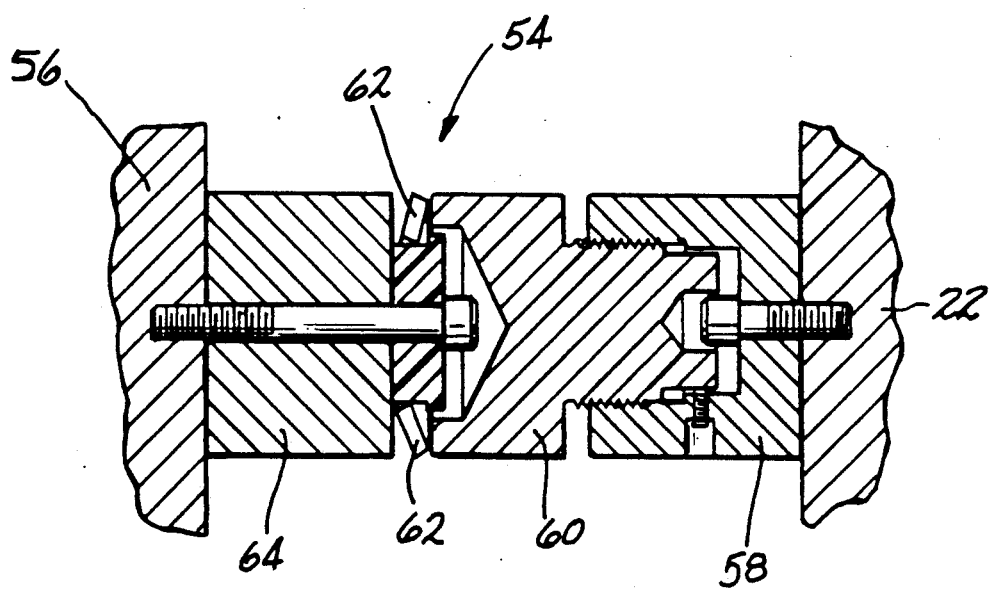
FIG. 6 is a sectional view of the force compensator of FIG. 5.

In FIGS. 5 and 6, an injection molding machine is illustrated in which the stack mold includes a force compensator 54. The force compensator 54 is preferably located within the stack mold arrangement between the center movable platen 22 and the outer movable platen 56. The force compensator is used to balance the reaction to the injection nozzle/sprue bush separating force that is transmitted along the sprue bar 18.

The compensator 54 consists of a mounting block 58 fastened preferably to the manifold 52 in the center platen 22, an adjustable post 60 threaded into the block 58, a compression spring 62 and a fixed block 64 mounted to the platen 56 of the moving platen half 32 of the stack mold.

By unscrewing or screwing the threaded post 60, the amount of force developed by the spring 62 can be adjusted until it exactly balances the reaction to the separating force that is being transmitted along the sprue bar. The spring force effectively counteracts the additional force (typically 20 tons) applied to the clamping force of the stack mold half mounted to the moving platen 16. Thus equal clamping forces are restored to both halves of the stack mold.

Figure 7:
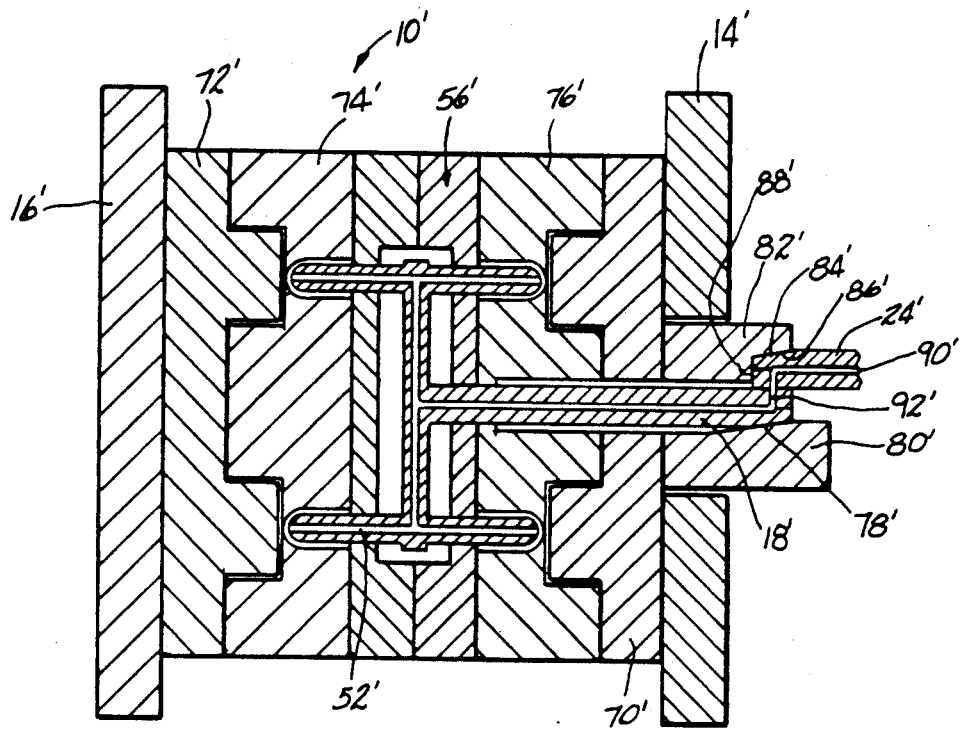
FIG. 7 illustrates yet another embodiment in which the molding apparatus shown in section has a sprue bar axially offset from the injection nozzle.

FIG. 7 illustrates an injection molding machine 10' wherein the components forming the stack mold arrangement are in a closed position. The machine includes a stationary core half 70', a movable outer platen 16' having a movable core half 72', and a movable central platen 156 having mold cavity halves 74' and 76' fixed thereto. The machine further includes a sprue bar 18' and an injection nozzle 24' which is axially offset from the sprue bar 18'.

The sprue bar 18' has a wedge shaped end 78' which engages with a matching wedge shaped block 80' bolted to the stationary core half 70'. A second block 82' bolted to the stationary core half 70' has a similar wedge shape 84' that engages a matching wedge shape 86' on the injection unit nozzle 24'. The nozzle 24' butts against the end of the block 82' at surface 88' to prevent axial forces being transmitted to the sprue bar 18'. The action of closing the mold causes the two sets of wedges to force the sprue bar and the nozzle into a sealed relationship such that passage 90' in the nozzle is aligned with a passage 92' in the sprue bar 18' and thus allow plastic resin to flow into the mold half 32 of the stack mold.

Figure 8:
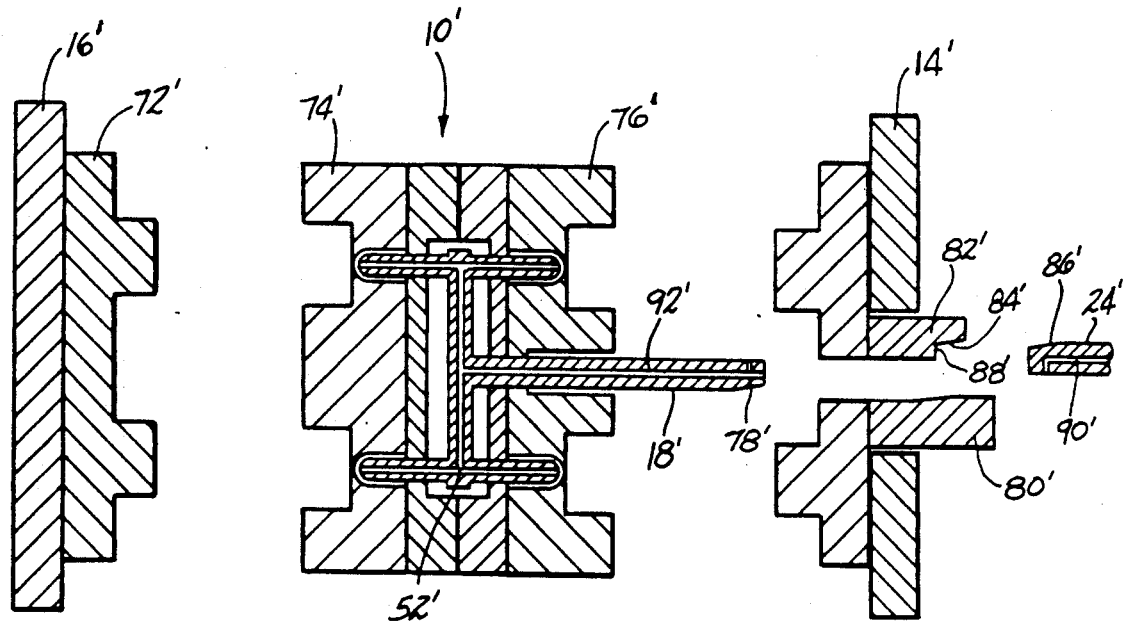
FIG. 8 illustrates the apparatus of FIG. 7 in section with the sprue bar and the injection nozzle in a mold open position.

FIG. 8 shows the injection molding machine 10' in a mold open position. As shown therein, the sprue bar 18' and the nozzle 24' are disengaged from each other and their respective wedges. Any suitable means known in the art (not shown) such as a rack and pinion system may be used to move the molds between their open and closed positions and to move the injection unit.

Figure 9:
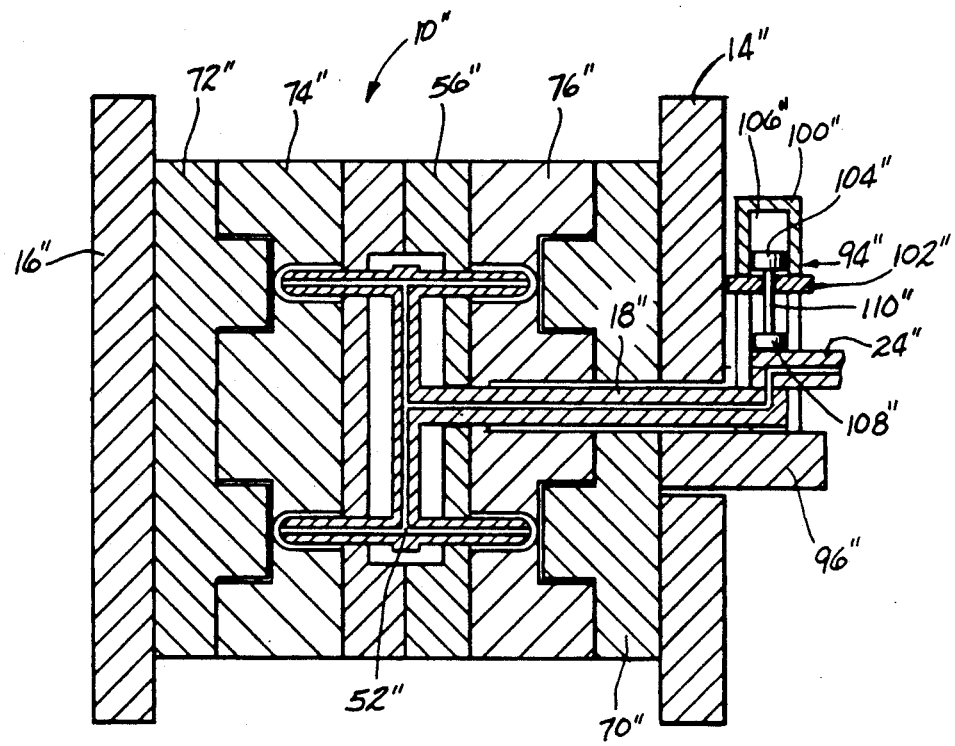
FIG. 9 illustrates yet another injection molding apparatus shown in section having a mechanism for sealing the injection nozzle to the sprue bar.

FIG. 9 shows an alternative approach for sealing a sprue bar 18" to an axially offset injection nozzle 24". In this approach, a side acting clamping mechanism such as hydraulic cylinder assembly 94" is used to seal the nozzle 24" to the bar 18". The hydraulic cylinder assembly 94" preferably comprises a sliding piston arrangement for clamping the sprue bar 18" to the injection nozzle 24".

The sliding piston arrangement may have a cylinder housing 100" mounted to a base 102" and a piston 104" slidable within a chamber 106" formed by the housing 100". The piston 104" is connected to a clamping piston 108" by shaft 110". The clamping piston 104" is used to apply the clamping force to the sprue bar 18" and the injection nozzle 24".

The base 102" is preferably supported on a block 96", which is in turn mounted to the stationary core half 70", by four mounting posts 112". The four mounting posts 112" are preferably located at the corners of the base 102". The posts 112" define opposed openings into which the sprue bar and injection nozzle are inserted.

Figure 10:
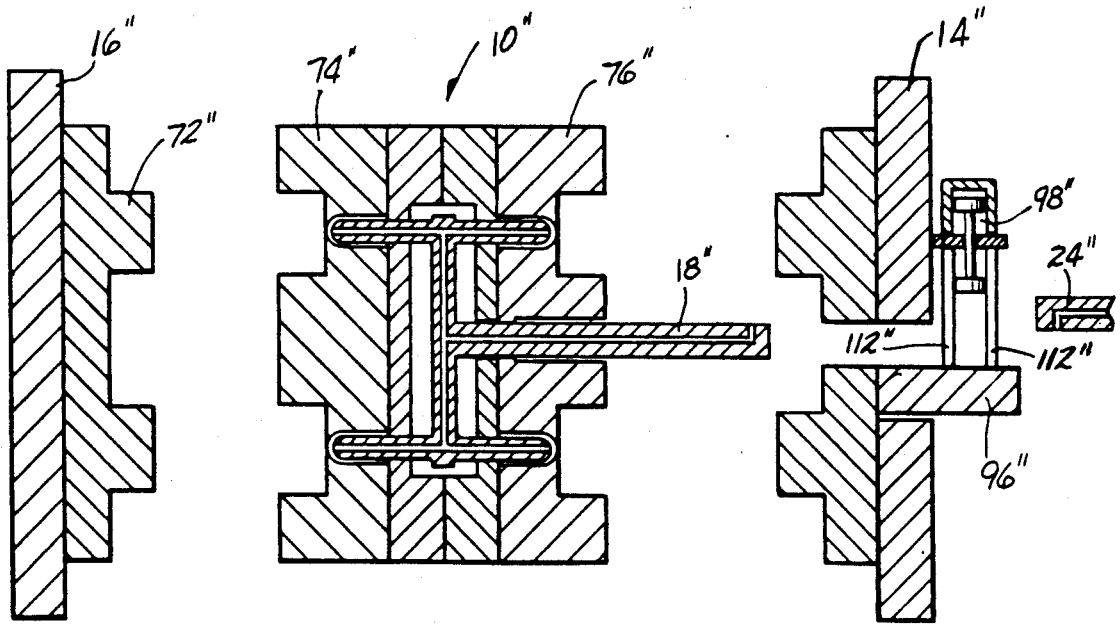
FIG. 10 illustrates the apparatus of FIG. 9 in section with the injection nozzle and sprue bar in a mold open position.

FIG. 10 shows the molding machine in the mold open position with the sprue bar 18" and the nozzle 24" disengaged and the sliding piston 104" in a retracted position.

In the embodiments of FIGS. 7-10, the sealing of the nozzle to the sprue bar is performed without imparting any force to the mold's parting line. Thus, unbalanced clamping forces do not result.

The problem of unbalanced forces on the two halves of a stack mold is widely known. No other attempts to resolve the problem are known beyond these disclosed here.

It is apparent that there has been provided in accordance with this invention a mold clamping equalization system which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An improved injection molding apparatus which comprises:
   a stack mold arrangement including a stationary mold member fixed to a stationary platen, a movable central mold member, and a movable outer mold member, said stationary and movable mold members forming at least two molds;
   means for injecting plastic material into said at least two molds;
   said injecting means including an injection nozzle communicating with a source of plastic material and sprue bar means engaging said nozzle for distributing plastic into said at least two molds;
   means for creating a clamping force on both sides of said mold arrangement so as to keep said molds closed during molding; and
   means for maintaining said sprue bar means in contact with said injection nozzle and for containing separation forces which occur at the connection between said sprue bar means and said injection nozzle so as to maintain balanced clamping forces on both sides of said stack mold arrangement.

2. The injection molding apparatus of claim 1 wherein said maintaining means comprises means for clamping said sprue bar means and said nozzle together.

3. The injection molding apparatus of claim 2 wherein;
   said injecting means comprises a barrel head; and
   said clamping means comprises at least one notch in said sprue bar means and at least one latch attached to said barrel head, said at least one latch being movable between a latched position just prior to injection of said plastic material and an unlatched position at an end of a period for applying said clamping forces during a molding cycle.

4. The injection molding apparatus of claim 3 further comprising:
   means for moving said at least one latch between said latched position and said unlatched position.

5. The injection molding apparatus of claim 4 wherein said moving means comprises at least one hydraulic cylinder-piston arrangement.

6. The injection molding apparatus of claim 5 further comprising:
   two notches on opposed sides of said sprue bar means;
   two latches for engaging said two notches; and
   a hydraulic cylinder-piston arrangement for moving each said latch, each said hydraulic cylinder-piston arrangement being fixed to said barrel head and to said latch.

7. The injection molding apparatus of claim 1 wherein said maintaining means substantially avoids any separation force imbalance by not transmitting residual force components to said stack mold arrangement.

8. The injection molding apparatus of claim 1 wherein said maintaining means comprises:
   shutter means mounted to said stationary platen for substantially preventing residual forces from being transmitted along said sprue bar means; and
   means for resisting any mold separation force.

9. The injection molding apparatus of claim 8 further comprising:
   at least one slot in said sprue bar means;
   said shutter means being moved between a position engaging said at least one slot and a retracted position; and
   said separation force resisting means comprising at least one piston-cylinder mounted to said stationary platen and to said means for injecting said plastic material.

10. The injection molding apparatus of claim 9 further comprising:
    at least one additional piston cylinder arrangement for moving said shutter means between said slot engaging position and said retracted position.

11. The injection molding apparatus of claim 8 wherein:
   said sprue bar means has two slots on opposed surfaces; and
   said shutter means comprises two shutters for engaging said slots, each said shutter being movable along an axis substantially perpendicular to an axis along which said movable mold members move.

12. An injection molding apparatus which comprises:
   a stack mold arrangement including a stationary mold member fixed to a stationary platen, a movable central mold member, and a movable outer mold member, said stationary and movable mold members forming at least two molds;
   means for injecting plastic material into said at least two molds;
   said injecting means including an injection nozzle communicating with a source of plastic material and sprue means engaging said nozzle for distributing plastic into said at least two molds;
   means for creating a clamping force on both sides of said mold arrangement so as to keep said molds closed during molding;
   means for maintaining said sprue means in contact with said injection nozzle and for maintaining balanced clamping forces on both sides of said stack mold arrangement;
   said maintaining means being formed by a force compensator consisting of a fixed block mounted to a first mold half attached to one of said movable mold members, a mounting block attached to a second mold half attached to the other of said movable mold members, an adjustable post threaded into said mounting block and a compression spring between said adjustable post and said first block, whereby said spring is adjustable so as to develop a force which exactly balances the reaction to any separating force transmitted along said sprue means.

13. The injection molding apparatus of claim 12 further comprising:
   said fixed block being mounted to a core plate mold half of a first mold, and
   said moving block being mounted to a cavity plate mold half of said first mold.

14. An injection molding apparatus which comprises:
   a stack mold arrangement including a stationary mold member fixed to a stationary platen, a movable central mold member, and a movable outer mold member, said stationary and movable mold members forming at least two molds;
   means for injecting plastic material into said at least two molds;
   said injecting means including an injection nozzle communicating with a source of plastic material and sprue bar means engaging said nozzle for distributing plastic into said at least two molds;
   means for creating a clamping force on both sides of said mold arrangement so as to keep said molds closed during molding;
   means for maintaining said sprue bar means in contact with said injection nozzle and for maintaining balanced clamping forces on both sides of said stack mold arrangement; and
   said maintaining means comprising means for preventing axial forces being transmitted from said injection nozzle to said sprue bar means.

15. The injection molding apparatus of claim 14 wherein said preventing means comprises:
   first and second blocks mounted to said stationary mold member;
   said first block having a shaped surface for engaging a similarly shaped surface on said sprue bar means;
   said second block having a shaped surface for engaging a similarly shaped surface on said injection nozzle; and
   said injection nozzle butting against an end surface of said second block, thereby substantially preventing axial forces from being transmitted to said sprue bar means.

16. The injection molding apparatus of claim 14 wherein:
   said sprue bar means and said injection nozzle are axially offset from each other and in an overlapping relationship when said mold is in a closed position and disengaged from each other when said mold is in an open position.

17. The injection molding apparatus of claim 16 further comprising:
   means for clamping said nozzle to said sprue bar means; and
   said clamping means being mounted on a block which is in turn mounted on the stationary half of said mold.

18. The injection molding apparatus of claim 16 further comprising:
   said nozzle being sealed to said sprue bar means without imparting any force to the parting line of said mold thereby avoiding unbalanced clamping forces.

* * * * *